Nov. 5, 1963  B. VER NOOY  3,109,410
PASSAGE INDICATOR FOR PIPELINE SCRAPERS AND THE LIKE
Filed Dec. 24, 1959  5 Sheets-Sheet 1
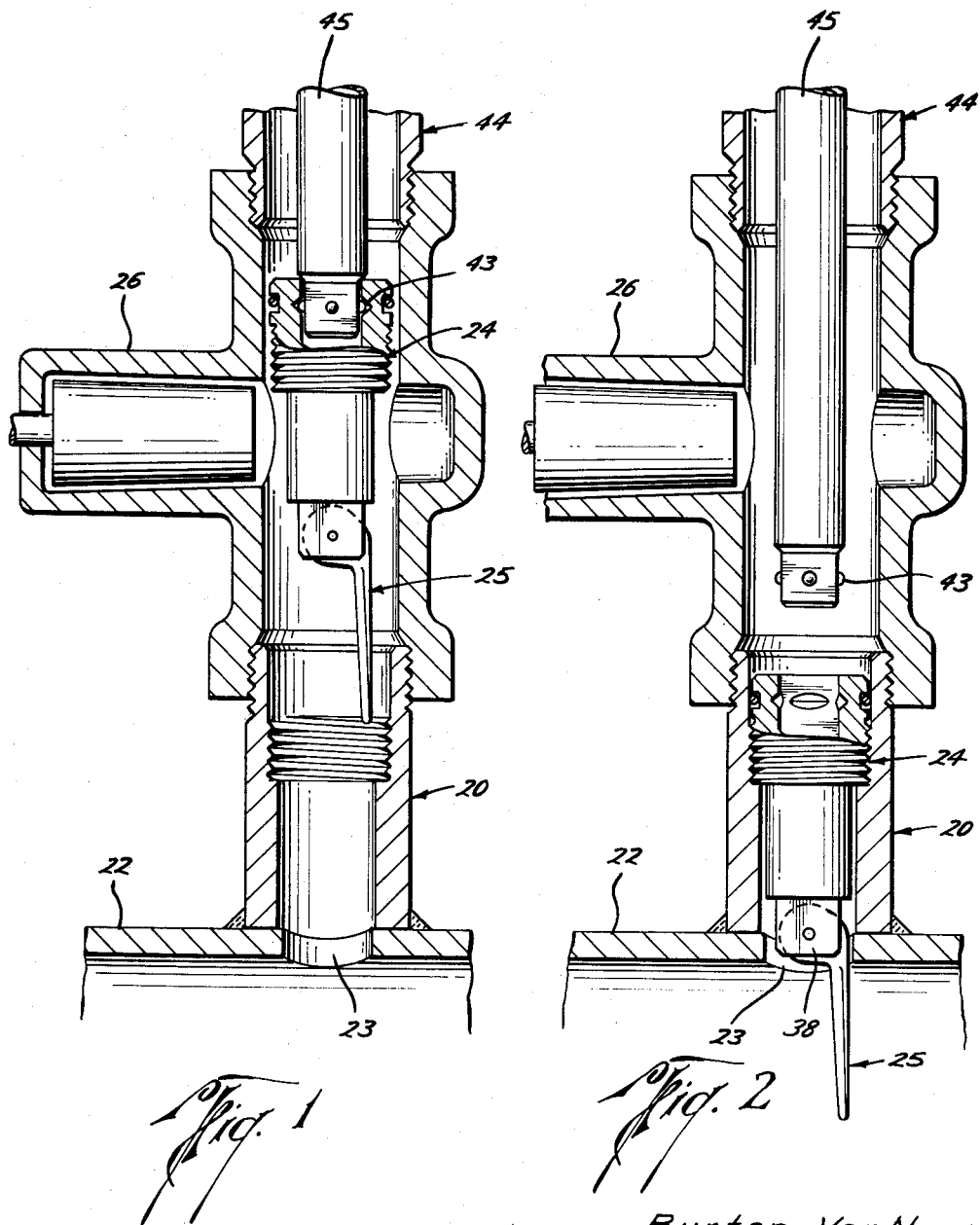
Burton Ver Nooy
INVENTOR.
BY
ATTORNEYS

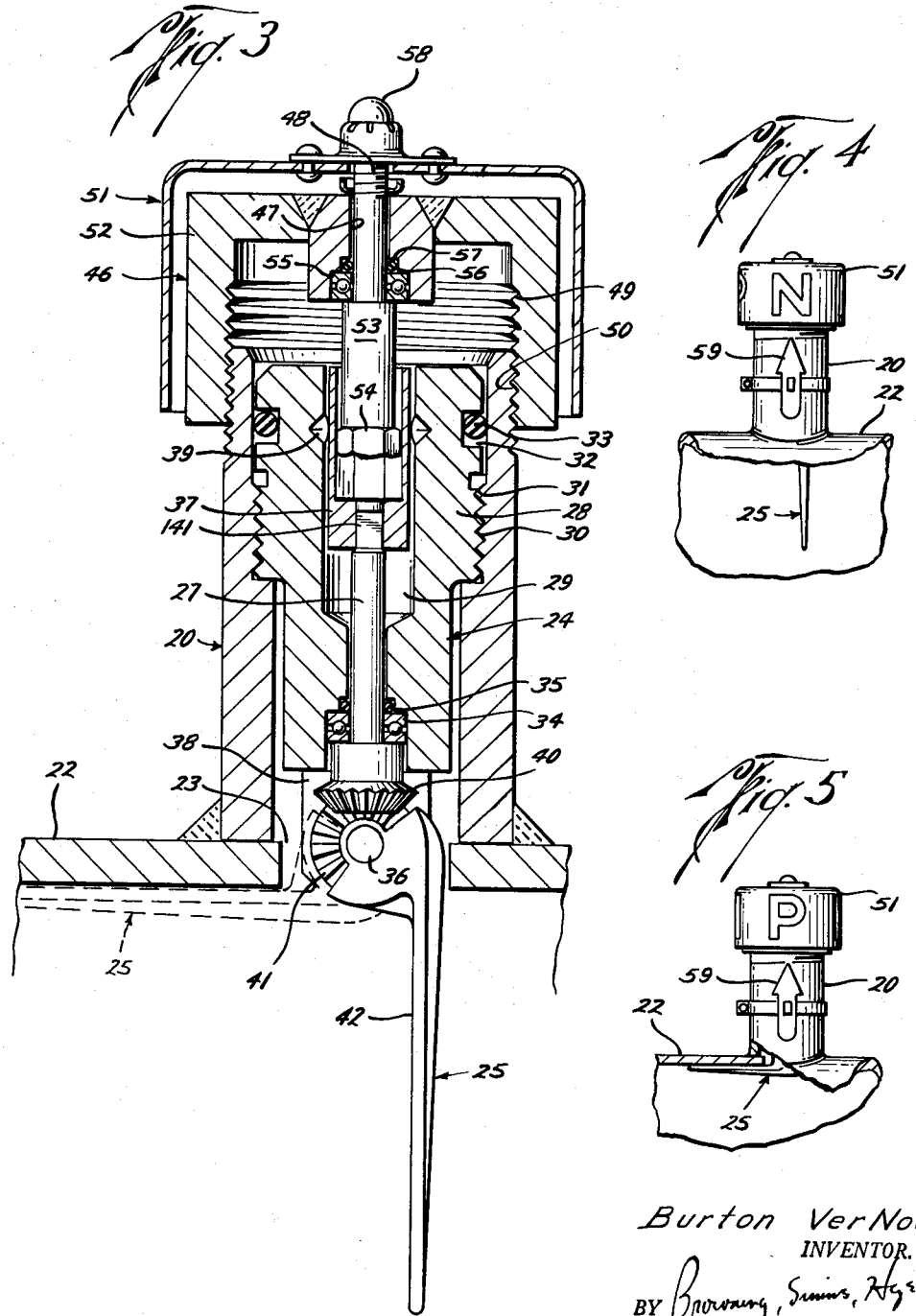

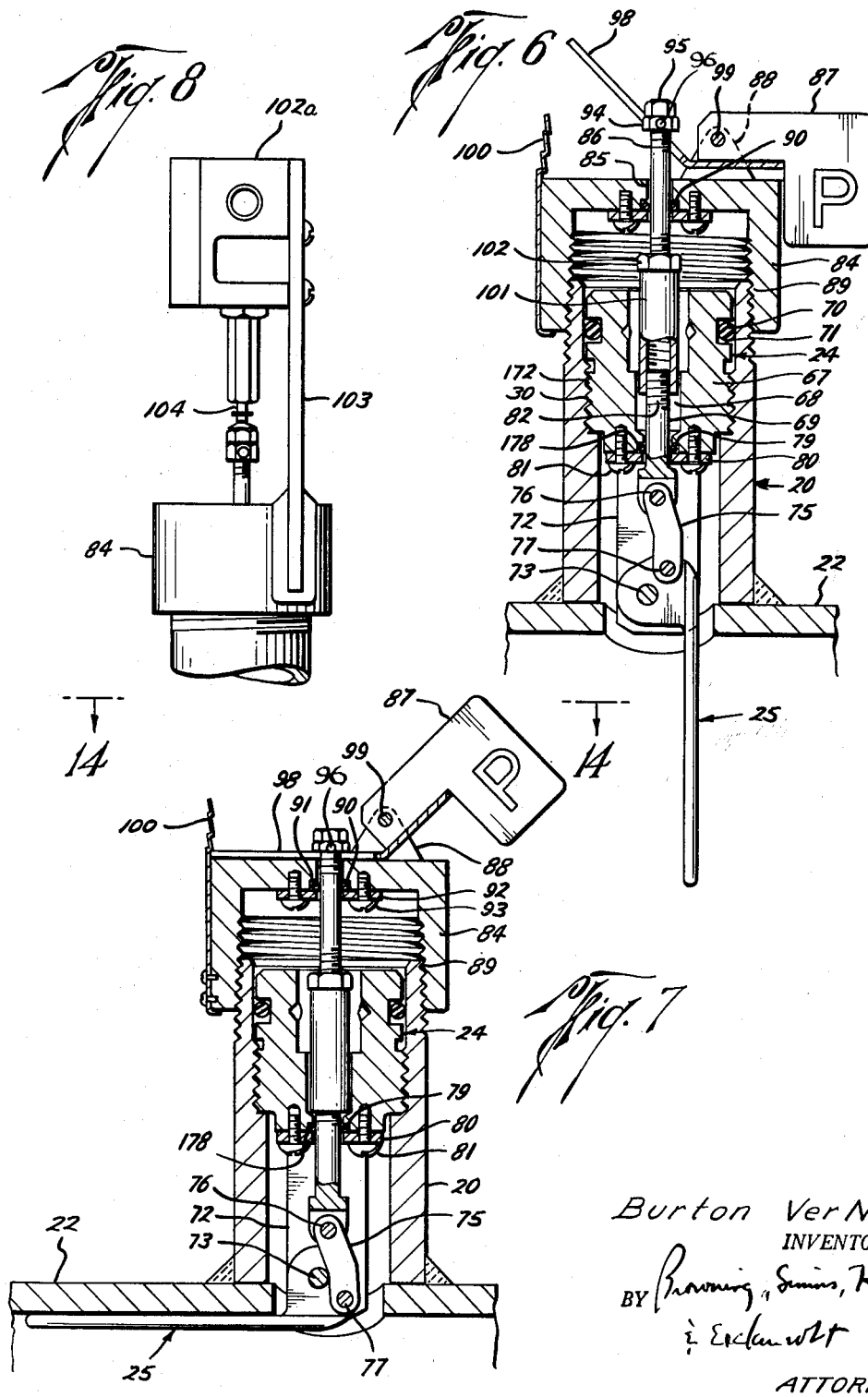

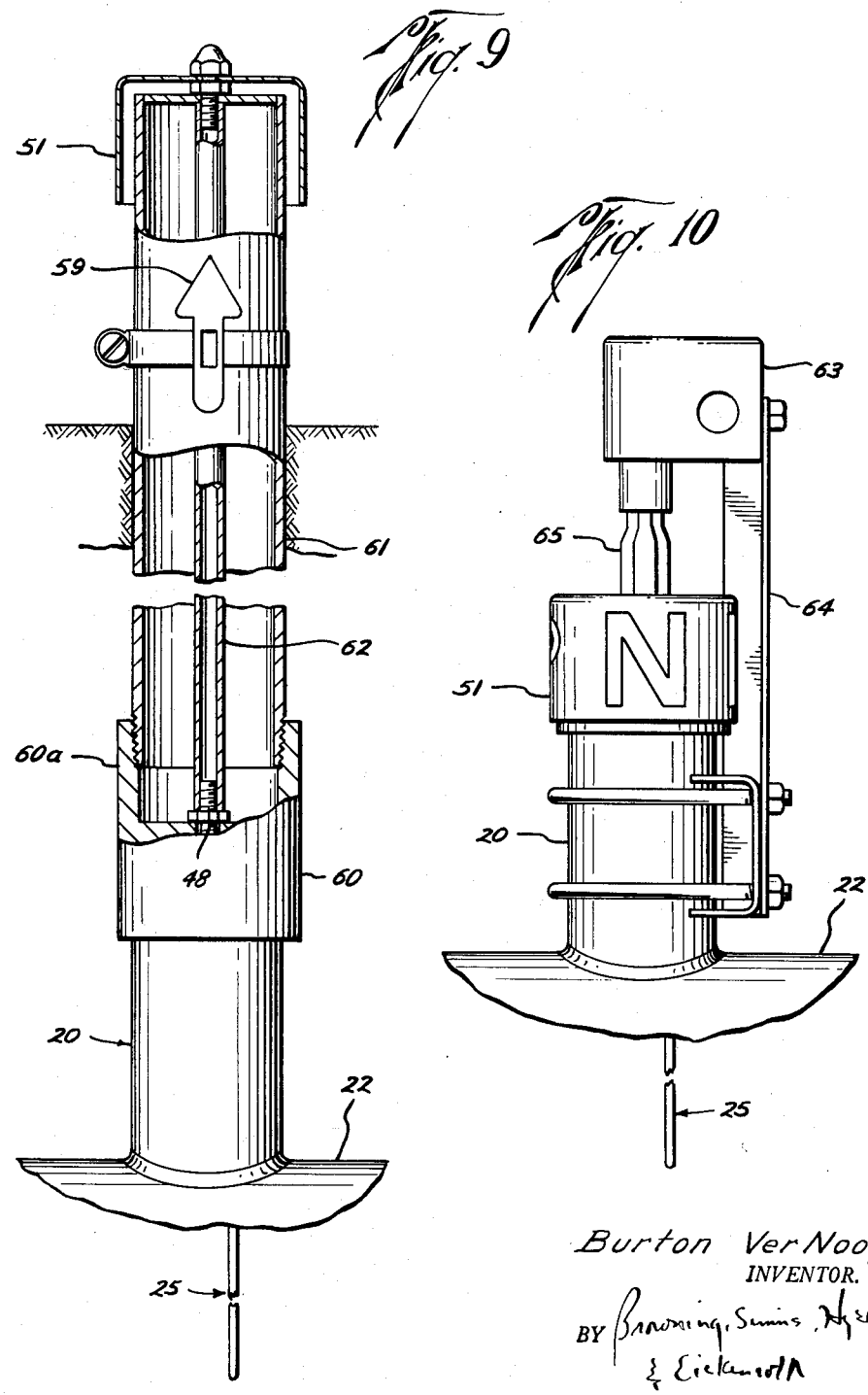

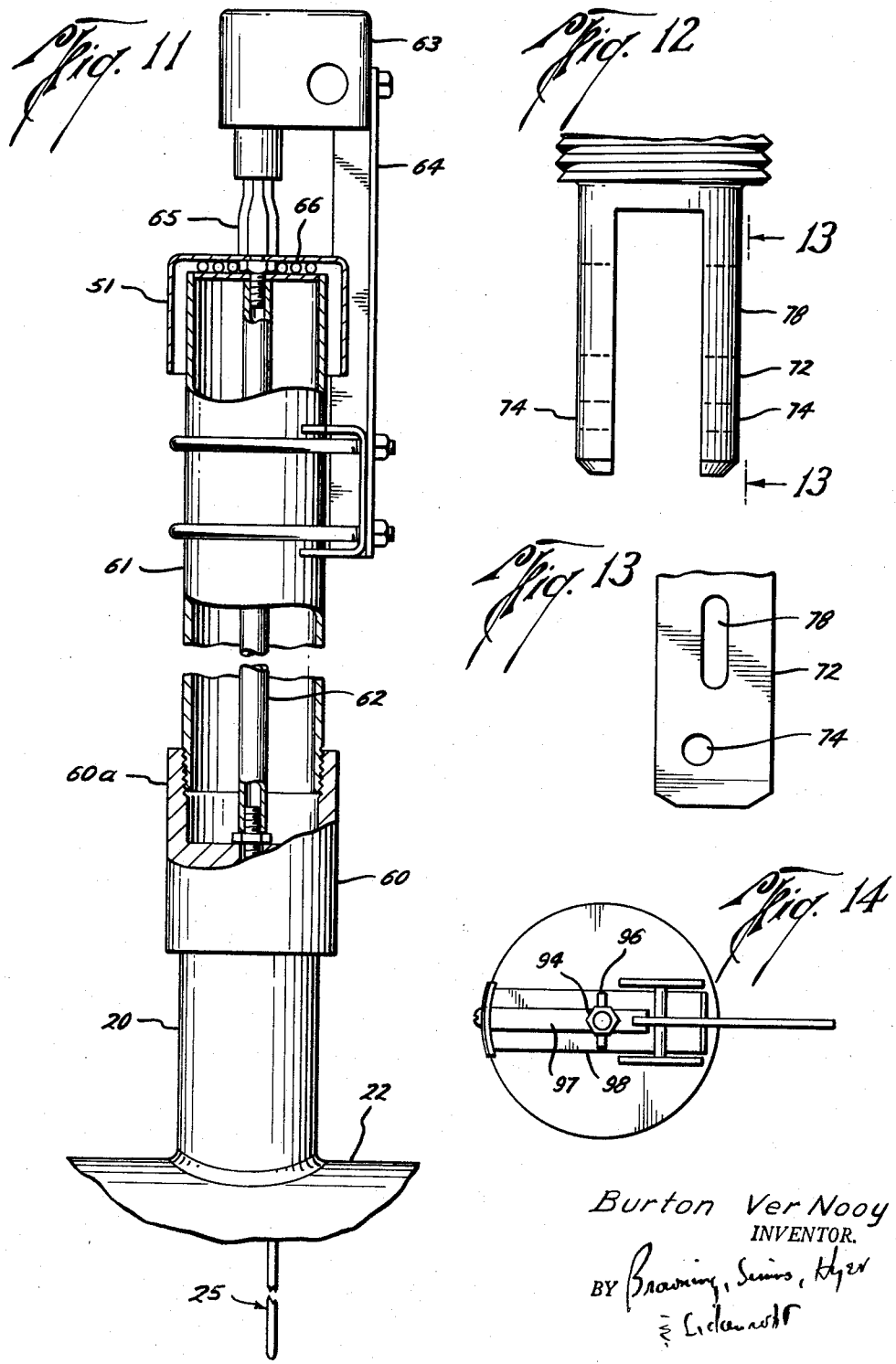

United States Patent Office 3,109,410
Patented Nov. 5, 1963

3,109,410
PASSAGE INDICATOR FOR PIPELINE
SCRAPERS AND THE LIKE
Burton Ver Nooy, Tulsa, Okla., assignor to
T. D. Williamson, Inc., Tulsa, Okla.
Filed Dec. 24, 1959, Ser. No. 861,964
7 Claims. (Cl. 116—124)

This invention relates to an improved apparatus for indicating the movement of a body, such as a scraper or the like, past a predetermined point along a conduit. In one of its aspects, it relates to such an indicating apparatus which can be both installed and removed from a pipeline in the field without substantial loss of pressure from the line and without interrupting operation of the line.

In the pipeline industry, cleaning devices, known as scrapers, are moved through the pipelines to scrape and clean the interior pipe walls. In addition, it is common practice to employ batching pigs for separating two different fluids being successively transmitted through the line. There are many instances in which it is desirable to determine when a scraper, batching pig or other body past has moved past a given point along the pipeline.

For this purpose, indicating apparatus has been provided which has comprised a trigger element mounted in a housing and disposed in the path of a scraper or other device in the pipeline and operably connected to an externally observable signal means for indicating when the trigger is engaged by the scraper. The Patent 2,371,251 to David U. Mauldin is illustrative of one type of such indicating apparatus. This type of apparatus cannot be installed in the field without first shutting the pipeline down. Furthermore, such apparatus cannot be removed from the line for inspection and possible repair or replacement of parts, without first shutting the pipeline down. Inasmuch as it is desirable to eliminate the down time of the line insofar as possible, such type of indicating device leaves much to be desired. The signaling or indicating device shown in Ver Nooy Patent No. 2,782,407 solved some of these difficulties by providing apparatus that could be installed on a pipeline in the field without the necessity of shutting the line down, and it is an object of this invention to provide a further improved indicating apparatus of the general character described which will avoid still others of the above mentioned difficulties.

It is still another object of the invention to provide indicating apparatus which can be installed on a pipeline in the field, subsequently removed and inspected for possible repair or replacement of parts, and re-installed on the line without the necessity of shutting the line down.

It is the further object of this invention to reduce the shut-down time of a pipeline by providing indicating apparatus that can be installed in a standard nipple or housing on the line in the field, subsequently removed and inspected, and then re-installed in the housing on the line, all without substantial loss of pressure in the line and without the necessity of interrupting operation of the line.

These and other objects and advantages are inherent and will become apparent upon a consideration of the written description, claims and drawings herein contained.

In the drawings, wherein like characters designate like parts:

FIG. 1 is a view, partially in vertical section and partially in elevation of one embodiment of a plug assembly which is part of the indicating apparatus of this invention being landed in a housing on a pipeline, the plug assembly being shown as it is being inserted through a valve and into the housing by a landing machine.

FIG. 2 is a view similar to FIG. 1 but showing the plug assembly landed in the housing.

FIG. 3 is an elevation with parts broken away of one embodiment of the indicating apparatus of this invention installed on a pipe.

FIG. 4 is an elevation, with the pipe broken away, of the indicating apparatus of FIG. 3, showing the relative position of the trigger and indicator before engagement of the trigger by a body passing through the pipe.

FIG. 5 is a view of the apparatus of FIG. 4 showing the relative position of the trigger and indicator after the body has engaged the trigger.

FIG. 6 illustrates another embodiment of the indicating apparatus of this invention wherein movement of the trigger from extended to retracted position reciprocates a shaft to operate a signal means.

FIG. 7 is a view of the apparatus of FIG. 6 after the trigger has been engaged by a body passing through the pipe showing the relative position of the trigger and the indicator after such engagement.

FIG. 8 is an elevation of a signal means suitable for use with the plug assembly of the indicating apparatus of this invention according to FIG. 6.

FIG. 9 is an elevation of a signal means suitable for use in connection with a plug assembly of the indicating apparatus of this invention as shown in FIG. 3.

FIG. 10 is another embodiment of a signal means suitable for use in connection with the plug assembly of the indicating apparatus shown in FIG. 3.

FIG. 11 is still another embodiment for a signal means suitable for use in connection with the plug assembly of FIG. 3.

FIG. 12 is a view of the lower portion of the plug assembly of FIG. 6, the trigger assembly being eliminated for purposes of this illustration.

FIG. 13 is a side view of the portion of the plug assembly shown in FIG. 12 and is taken on the line 13—13 of FIG. 12.

FIG. 14 is a view of the signal means of FIG. 7, taken along the line 14—14 of FIG. 7.

According to this invention, indicating apparatus is provided which comprises a plug assembly, indicated generally at 24, adapted to be landed into sealing engagement in a housing 20 which has previously been installed on a pipeline 22. The plug assembly includes a trigger element indicated generally at 25, adapted to extend through an opening 23 in the pipeline and into the path of a cleaning device or like body moving through the pipeline (FIGS. 1 and 2). A signal means, for example, such as that shown in FIGS. 3 and 4 is then connected to the trigger for operation in response to movement of the trigger when it is engaged by the body moving through the pipe.

According to one aspect of this invention, a housing 20, made from a standard nipple can be mounted to a pipeline, as by welding, and a hot-tap made into the line by means well known to the art. Plug assembly 24 may then be attached to a landing device and landed in the housing 20 with trigger element 25 extending through the tapped opening in the line and into the path of a body moving through the pipe. This sequence of landing the plug assembly is shown in FIGS. 1 to 2. When the plug assembly has been landed, the tapping valve 26 may be removed and a signal means mounted on housing 20 so as to be connected to the trigger to signal movements of the trigger. This apparatus can be dismantled by first disconnecting the signal means from the trigger and removing it from the housing. A valve 26 is then mounted on the housing and the plug assembly is withdrawn from the housing into a landing means as illustrated in the sequence of FIG. 2 to FIG. 1. The valve may then be closed and the plug assembly removed from the landing means for inspection. When it is desired to re-install the indicating apparatus, the mounting procedure described above is repeated. Thus it is apparent that the indicating apparatus can be mounted in a housing on a pipeline while the pipeline is in service and moreover, it can be removed from the line, inspected and repaired, and then re-installed on the line, all without shutting the line down.

Referring now in detail to the drawings, and particularly to FIG. 3, one embodiment of this invention is shown wherein movement of the trigger from its extended position in the pipe to its retracted position along the wall of the pipe turns a shaft carried by the plug assembly to operate a signal or indicating means. In this embodiment, plug assembly 24 comprises a plug body 28 having a bore 29 for rotatably receiving shaft 27, a pair of depending spaced apart flanges 38 for pivotably mounting a trigger 25, and a seal, such as O-ring 33 carried in an annular groove 32, for sealing with housing 20. Bore 29 perferably is enlarged at its upper end and mill slots 39 are provided therein for releasably connecting the plug body to the lower end of a landing bar as shown in FIG. 1. Threads 30 on the face of the plug body engage mating threads 31 in housing 20 to removably connect the plug assembly to the housing. Although a threaded connection is shown for this purpose and is convenient for use in conjunction with a tapping machine for the landing operation, it is understood that other connecting means may be adopted without departing from this invention.

As noted above, shaft 27 is rotatably mounted in body 28 and bears against a thrust bearing 34 mounted between the plug body and shaft. The lower end of shaft 27 terminates in a miter gear element 40 which engages a mating miter gear element carried by the trigger so that as the trigger is moved, as by engagement by a body moving through the pipe, shaft 27 is rotated to operate the signal means as will be more fully explained below. A seal such as O-ring 35 provides a fluid tight seal between the shaft and plug body. The upper end 141 of shaft 27 is squared to engage a coupling 37 for connecting the trigger to the signal means after the plug assembly has been landed. Coupling 37 may be an ordinary socket wrench fitting if desired.

In the embodiment of FIG. 3, trigger element 25 is swingably mounted between flanges 38 on a pivot pin 36, and is provided at its pivot end wtih an off-set miter gear element 41 which engages mating miter gear element 40 on shaft 27, whereby motion of trigger 25 turns shaft 27 to operate a signal means. The arm portion 42 of trigger 25 preferably extends across only a minor portion of the pipe diameter, and should be of sufficient length to engage a body moving through a conduit past a point at which the indicating apparatus is mounted.

It will be observed that the plug assembly portion of the indicating apparatus of this invention having been assembled as described in the foregoing paragraphs, is now ready to be installed on a pipeline. Inasmuch as the plug assemblies of the various embodiments of this invention can be installed in the same manner, the following description illustrating one installation procedure will be taken as being applicable to all.

A housing 20, which can be made from a standard nipple, is mounted on the side of a pipeline, as by welding, and a valve 26 and tapping machine 44 are mounted on the nipple such that the valve may be opened and the boring bar 45 reciprocated therethrough to bore hole 23 in pipe 22.

When hole 23 has been drilled, boring bar 45 is retracted into its housing and valve 26 is closed. The tapping machine is then removed and the drill element detached from the boring bar. Plug assembly 24 is then mounted on the boring bar. As can be seen in FIGS. 1 and 2, boring bar 45 is provided with a plurality of spring loaded balls 43 at the out-of-round end of the bar. The spring loaded balls engage grooves 39 in the wall of the bore 29 to connect the plug assembly to the boring bar (FIG. 1). With the plug assembly thus mounted, the tapping machine is again connected to the valve and the valve is opened to permit the plug assembly to be advanced into the housing as shown in FIG. 1. Of course, rotary movement of the boring bar threads the plug into position as shown in FIG. 2. At this stage, plug assembly 24 seals off housing 20 and trigger 25 extends into the pipeline. The tapping machine and valve can now be removed to permit installation of the signal means.

It will be understod that it may be desirable to adjust the plug assembly in the housing so that the trigger will be swung about its pivot when engaged by a body moving through the pipe, and further, that the plug assembly will extend into the housing a sufficient distance so that the trigger in its retracted position will lie along the pipe to provide for a minimum of distortion of a body passing through the pipe. For the purpose, an arrow may be provided on the top of the plug body indicating the direction of movement of the trigger. A socket drive or other suitable tool can then be inserted into the out-of-round portion of the bore in the plug body to turn the plug until the arrow points downstream. Coupling 37 can then be dropped through bore 29 and onto the upper end of shaft 27. The coupling is then rotated to determine the extent of movement of the trigger from its extended to its retracted position. In the preferred embodiment, the miter gears are arranged in one-to-one ratio so that shaft 27 is rotated 90 degrees when the trigger is swung from its extended position to its retracted position along the pipe. If necessary, the coupling can be removed and the plug either advanced further into the housing or retracted, as the situation demands, in order to position the plug assembly substantially as shown in FIG. 2.

With the plug assembly thus sealably landed and adjusted to its desired position in the housing, one or more signal means can be connected thereto for signaling that the trigger has been moved by a body passing through the pipeline. One type of signal means is shown in FIGS. 3, 4 and 5, and includes a cap assembly 46 and indicator 51. Cap assembly 46 comprises body element 52 having internal threads 49 for engaging mating threads 50 on housing 20 and a bore 47 for rotatably receiving shaft 48. A spacing sleeve 53 is mounted on the lower end of shaft 48 and is held by drive-nut 54 and engages thrust bearing 55 mounted in an annular groove in bore 47 to thereby permit rotation of shaft 48 within body element 52 in response to movement of trigger 25. A seal 56 is carried in annular groove 57 in bore 47 and is adapted to accomplish a fluid-tight seal between shaft 48 and body element 52.

With cap assembly 46 thus assembled, coupling 37 is inserted into bore 29 in plug body 28 and into connecting engagement with shaft 27. Coupling 37 slidably received drive-nut 54 so that cap assembly 46 can be threaded to housing 20. Indicator 51 is then mounted as by anchor nut 58 to the upper end of shaft 48. With the indicating apparatus thus assembled and mounted on the plug assembly, movement of the trigger by a body passing through the pipeline rotates indicator 51 to signal passage of the body. The outer face of indicator 51 is provided with suitable letters, that is, N and P which together with arrow 59 indicate that the body has not passed or has passed, respectively as shown in FIGS. 4 and 5.

In the event it is desired to remove the indicating apparatus for inspection, the foregoing installation procedure is reversed.

Another signal means suitable for use with plug assembly 24 of the embodiment of FIG. 3 is shown in FIG. 9. In this embodiment, coupling 60 is essentially the same as cap 52 of FIG. 3, except that an upper extension 60a is provided thereon to connect housing 20 with housing extension 61. Extension shaft 62 is connected to shaft 48 above seal 56 to thereby permit the signal indicator to extend above ground level even though the plug assembly may be installed on a buried pipeline. Indicator 51 is mounted on extension shaft 62 as was explained above in connection with shaft 48 in FIG. 3. Arrow 59 is mounted on housing extension 61 below indicator 51. It will be observed that housing extension 61 and extension shaft 62 are preferably mounted above seal 56. Thus pressure will not be lost from the pipeline in the event that housing extension 61 is damaged or broken. Since indicator 51 is connected to shaft 48 through extension shaft 62, movement of trigger 25 will rotate indicator 51 to indicate passage of the body through the pipe as explained above in connection with the embodiment of FIG. 3.

Housing extension 61 can be made in a light weight or it can be provided with a fracture groove so that in the event a truck or the like hits the upper end of the extension, it will break off or bend without damaging the main part of the apparatus below it.

Still other signal means suitable for use with plug assembly 24 of FIG. 3 are shown in FIGS. 10 and 11. In FIG. 10, in addition to the visual indicator 51 previously described, a micro-switch assembly 63 is mounted on housing 20 by brackets 64. The micro-switch control arm 65 engages indicator 51 so that as indicator 51 is rotated by movement of trigger 25, micro-switch 63 is closed and actuates suitable electronically operated signal means (not shown) of a type well known in the art.

In FIG. 11, the micro-switch assembly and visual indicator of FIG. 10 is secured to extension 61 of housing 20 to permit the indicating mechanism to be visual above ground level similarly as was described in connection with FIG. 9. Here, as before, housing extension 61 is mounted on housing 20 by coupling 60 and extension shaft 62 is provided to connect shaft 48 to the indicator 51 and micro-switch 63. The operation of the embodiment of FIG. 11 is similar to that discussed in connection with FIG. 10 and will not be repeated.

It will be understood that the friction in the miter gear drive between trigger 25 and shaft 27 can be sufficient to maintain trigger 25 in its retracted position along the pipeline and thereby actuate micro-switch 63 to give a continuous electrical signal as well as a continuous visual indication that a body has passed trigger 25. In some applications, it may be desirable to provide a return spring 66 (FIG. 11) which can be of sufficient strength to overcome friction in the miter gear drive and return trigger 25 to its extended position in the pipe. In such application, it is contemplated that micro-switch 63 may be actuated to start a conventional type of clock-work timer (not shown) for the purpose of initiating a signal for a predetermined length of time.

While several signal means and combinations thereof have been described for use in connection with the embodiment of the indicating apparatus of this invention according to FIG. 3, it will be observed by those skilled in the art, after reading the disclosure herein contained, that other signal means and combinations thereof may be used without departing from this invention. Further, the indicating apparatus, including various signal means and combinations thereof, may be installed on a pipeline in the field, subsequently removed from the line for inspection, and then re-installed on the line, all without substantial loss of pressure from the line and without the necessity of shutting the line down during these operations.

Referring now to the embodiment of this invention as shown in FIGS. 6 and 7, movement of the trigger from its extended position to its retracted position reciprocates a rod carried by the plug assembly to operate the signal means. In this embodiment plug assembly 24 comprises a plug body 67 having a bore 68 for reciprocably receiving rod 69, and seal 70 is carried in annular groove 71 of the plug body 67 for providing a fluid-tight seal between the plug assembly and housing when the plug is in its landed position. Threads 172 on the outer surface of plug body 67 are adapted to engage mating threads 30 on the inside of housing 20 for removably connecting the plug assembly to the housing.

Trigger 25 is pivotably mounted on spaced lugs 72 which extend downwardly from the plug body 67 and the trigger is adapted to swing about pivot pin 73 which is mounted in holes 74 in the lower end of lugs 72. Trigger 25 is connected to rod 69 by connecting link 75, the latter being pivotally connected to rod 69 by pin 76 on one end and to trigger 25 by pin 77 on the other end. It will be noted (FIGS. 12 and 13) that a slot 78 has been provided in lugs 72 for slidably receiving pivot pin 76 to locate and guide rod 69 during its reciprocating movement in plug body 67 as trigger 25 moves in response to engagement with a body moving through the pipe. It will be also noted that pivots 73, 76 and 77 and links 75 are so arranged that a substantially straight downward pull is exerted on rod 69 when trigger 25 is moved.

A seal 178 is carried in annular groove 79 in the wall or bore 69 for providing a fluid-tight seal between body member 67 and rod 68. Seal retainer 80 is mounted between lugs 72 and is connected to body 67 by screws 81. Rod 69 is threaded at its upper end 82 for connection to a signal means as will be described in detail below, and the rod preferably terminates at the enlarged portion of bore 68 and below annular mill slots 83 in a wall thereof to permit attachment of the plug assembly to the landing means similarly as was described in connection with the plug assembly of FIG. 3.

The signal means of FIG. 6 includes a cap element 84 having a bore 85 therein for slidably receiving shaft 86, and a signal flag 87 pivotably attached to the top of cap 84 by brackets 88, whereby flag 87 is raised by the downward movement of shaft 86 in response to movement of trigger 25 to indicate a body has passed. Cap 84 is removably connected to housing 20 as by threads 89. Shaft 86 can have a seal with cap 84 as by O-ring 90.

The upper end of shaft 86 is threaded to receive lug nut 94 and lock nut 95, whereby lug 96 on nut 94 rides in groove 97 on flag arm 98 (FIG. 14) to pivot flag 87 about pivot pin 99 on brackets 88 as shaft 86 is raised or lowered by movement of trigger 25. Snap lock 100 is adapted to engage the end of arm 98 to hold the flag in a raised position as shown in FIG. 7. This arrangement for retaining the indicator flag in its raised position may be used to advantage in the case where an observer may not be in attendance at all times and it is only desirable to ascertain whether or not the body moving through the line has passed, and not the particular time of its passage. It will be understood that in some applications it may not be desirable to retain the flag or other indicating element in its "past" position and in such case, snap lock 100 may not be used. In this connection, it is noted that pressure in the line acts on the bottom portion of rod 69 to urge the rod upward and thereby return trigger 25 from its retracted position along the pipe (FIG. 7) to its engagement position in the pipe (FIG. 6). In this manner, the indicating apparatus can be automatically reset after passage of the body has actuated the signal means. This arrangement is particularly useful in connection with the micro-switch signal means of FIG. 8 and when the indicating apparatus may be located at a remote point along the pipeline not usually accessible to an observer.

The lower end of shaft 86 is threaded to receive connecting link 101, connecting link 101 being threaded at the other end to engage the threaded portion 82 of rod 69 to thereby operatively connect rod 69 and shaft 86 whereby motion of trigger 25 operates signal flag 87 as heretofore mentioned. Lock nut 102 is provided to bear against connecting link 101 during assembly to prevent rotation of the link on shaft 86 while the link is being threaded on rod 69.

With the plug assembly in its landed position as previously mentioned, the signal means of FIGURE 6 can be mounted thereon and connected to trigger 25 by threading cap 84 on housing 20 and simultaneously threading link 101 on rod 69 to thereby complete assembly of the indicating apparatus. With the apparatus thus assembled and with the trigger in its extended position, the indicating flag is in a down position advising that the body moving through the pipeline has not passed the indicating apparatus. Movement of the trigger from its extended position to its retracted position pulls rod 69 and shaft 86 down to thereby raise the indicating flag and signal passage of the body past the indicating apparatus.

Another signal means suitable for use with the plug assembly of FIG. 6 is shown in FIG. 8. In this embodiment, a micro-switch 102a is mounted on cap 84 by bracket 103 so that the switch arm 104 engages the end of shaft 86 whereby the micro switch is actuated by the reciprocable movement of shaft 86 in response to movement of trigger 25. Here again, this embodiment is particularly useful in remote regions where it is impractical for an observer to attend the indicating apparatus. Also this embodiment may be used in connection with a clockwork timing device similarly as was disclosed in connection with the embodiments of FIGURES 10 and 11.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Indicating apparatus for signaling passage of a body through a pipeline past a predetermined point in the line, comprising a housing having one end securable to the side of the pipeline in surrounding relation to an opening therein; and a plug assembly including a plug body insertable into and removable from the other end of the housing, means on the plug body for releasably securing it within the housing and sealing between the body and housing when the body is so secured, a trigger mounted on one end of the body for swinging from a first position in which it passes the housing and pipeline opening so as to extend into the path of said body moving through the pipeline, upon insertion of the plug body into secured position within the housing, into a second position when the plug body is so secured in which it is disposed along the pipeline to one side of the opening therein, as said moving body engages said trigger in passing said predetermined point, and back into said first position, when said body has passed said point, in which said trigger passes said housing and pipeline opening during removal of the plug body from secured position within the housing, and means on the other end of the body and connected to the trigger for signaling movement of said trigger between said first and second positions.

2. Indicating apparatus for signaling passage of a body through a pipeline past a predetermined point in the line, comprising in combination with a housing having an open end mountable on a side of the pipeline in surrounding relation to an opening therein; a plug assembly, including a plug body insertable into and removable from the other end of the housing, a trigger mounted on one end of the body for swinging between a first position extending substantially parallel to the axis of said body for passing the open end of the housing, upon said insertion and removal of the body, and a second position extending substantially perpendicularly of the axis of said body and to one side of the open end of said housing when the plug body is in a secured position within said housing, means on the other end of the plug body and connected to the trigger for signaling movement of said trigger between said first and second positions, means on the plug body for releasably securing it in said secured position within the housing to dispose the trigger in the path of the body moving through the pipeline so as to be swung from said first to said second position when engaged by said moving body in passing said predetermined point, and means on said plug body and housing for sealing therebetween in the secured position of said plug body.

3. Indicating apparatus of the character defined in claim 2, wherein said indicating apparatus also includes a cap connectable to the housing for closing the other end thereof when said plug body is secured therein, and said signaling means is disposed exteriorly of the cap and is connected to the trigger by a shaft which extends through the plug and body cap.

4. Indicating apparatus of the character defined in claim 3, wherein said shaft includes separate parts, one carried by the cap and the other by the plug body, and means for connecting the one shaft part to the other as said cap is connected to the housing.

5. Indicating apparatus for signaling passage of a body through a pipeline past a predetermined point in the line, comprising, in combination, a plug assembly including a plug body, a trigger mounted on one end of the plug body for swinging between a first position extending substantially parallel to the axis of the body and a second position extending substantially perpendicularly to the axis of said body, and means on the other end of the plug body and connected to the trigger for signaling movement of said trigger between said first and second positions; a hollow housing having one end mountable on the side of the pipeline in surrounding relation to an opening therein; said plug body being insertable into the other end of the housing when the trigger is disposed in its first position for releasably securing the plug body within the housing with the trigger in the path of the body moving through the pipeline so as to be swung by said body from said first position to said second position in which said trigger is disposed along the pipeline to one side of the opening therein, said plug body being removable from secured position in the housing when the trigger is swung back from said second to said first position, and means for securing the plug body in said secured position within the housing and sealing between the body and housing when said body is so secured.

6. Indicating apparatus of the character defined in claim 5, wherein said other end of the plug body is provided with means for engagement with a landing tool, and said trigger and signaling means are connected by a shaft extending through the plug body and made up of a first part carried from the signaling means and a second part carried by the plug body, said first part being releasable from said second part to permit engagement of the landing tool with said last-mentioned means on the other end of the plug body.

7. A pig indicator comprising a housing having an open pipeline engaging end and an opposite open signal end, a body sealingly disposed and releasably retained within said housing, a mandrel sealingly and rotatably disposed in said body and extending longitudinally of said housing, means on said mandrel for engaging a signal, a trigger operably engaged with said mandrel extending out the pipeline engaging end of said housing, and means on said body pivotably supporting said trigger for pivotal movement in a plane at right angles to the plane of rotation of said mandrel.

References Cited in the file of this patent

UNITED STATES PATENTS

| | | |
|---|---|---|
| 384,570 | Gronesteen et al. | June 12, 1888 |
| 1,584,049 | Ulrich | May 11, 1926 |
| 2,149,125 | Shelly | Feb. 28, 1939 |
| 2,580,928 | Kehm | Jan. 1, 1952 |
| 2,782,407 | Van Nooy | Feb. 19, 1957 |